Fig.13.

H. DOCK.
INTERNAL COMBUSTION ENGINE.
APPLICATION FILED AUG. 23, 1912.

1,135,365.

Patented Apr. 13, 1915.
7 SHEETS—SHEET 7.

Witnesses:
R. J. Halsiger.
C. H. Potter.

Inventor:
Herman Dock
by Byrnes Townsend & Brickenstein
Attys

UNITED STATES PATENT OFFICE.

HERMAN DOCK, OF WESTERLY, RHODE ISLAND.

INTERNAL-COMBUSTION ENGINE.

1,135,365.  Specification of Letters Patent.  Patented Apr. 13, 1915.

Application filed August 23, 1912. Serial No. 716,722.

*To all whom it may concern:*

Be it known that I, HERMAN DOCK, a citizen of the United States, residing at Westerly, in the county of Washington and State of Rhode Island, have invented certain new and useful Improvements in Internal-Combustion Engines, of which the following is a specification.

This invention relates to internal combustion engines and has for its object to provide an engine of this type with such means for admitting and exhausting the fuel gases as will enable it to work with a maximum efficiency. This object I attain by the use of an oscillating cylinder and oscillating admission and exhaust valves coördinated therewith in such manner as to provide an exceedingly rapid opening and closing of the admission and exhaust passages, and the maintenance of such passages fully open or fully closed during such periods as will insure the admission of an adequate supply of fuel, its thorough compression, the utilization to the maximum extent of the energy of the exploded gases, and a very thorough scavenging of the cylinder.

In the accompanying drawings Fig. 3 is a vertical section similar to Fig. 1, of the cylinder, valves, and upper casing, with the intake valve just fully opened, which occurs after a rotation of the main-shaft through about 30 degrees from the starting point, as shown in the valve diagram, Fig. 13.

In carrying my invention into effect, I provide the cylinder 2 with a transverse cylindrical head, and place the intake and exhaust openings, 15, 21, in the opposite cylindrical sides of the head, the piston 1 reciprocating in the cylinder-body with its lower end connected directly to the crankpin 3 on the main shaft 8. The cylinder oscillates about the axis of the transverse cylindrical head, the latter being journaled in independently oscillating valves 17, 23 which are in turn journaled in a suitable casing. The oscillating valves are suitably operated from the main shaft, and serve to open and close the intake and exhaust openings or ports in the cylinder for the admission of fuel and the removal of exploded gases.

Figure 1:
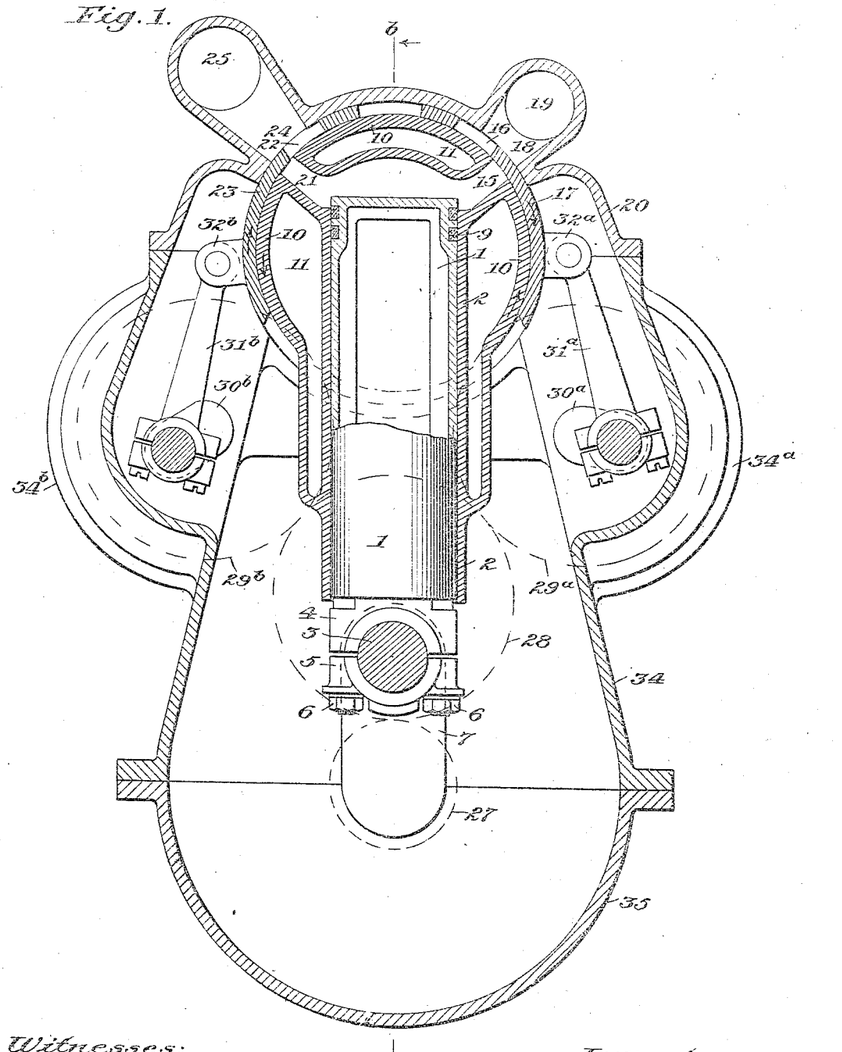
—Figure 1 is a vertical plan view of the engine along the line "a—a" of Fig. 2, with the exhaust valve just closing, and the intake valve ready to open.
Figure 4:
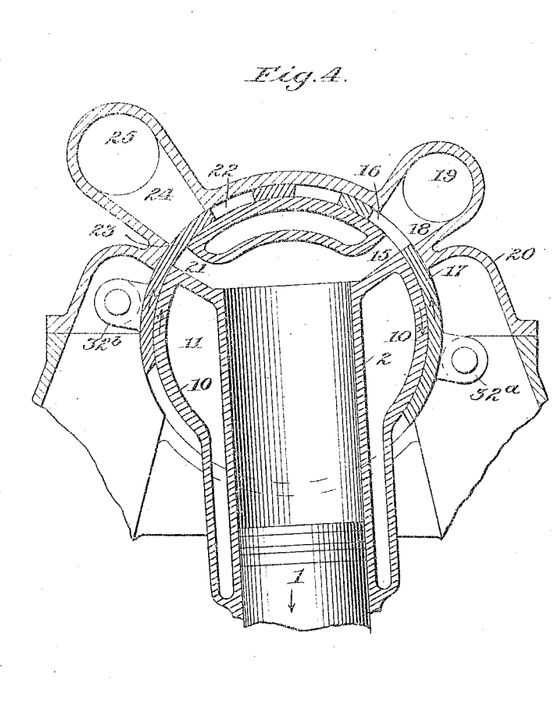
Fig. 4 is a similar view, showing the intake valve still fully open, and just beginning to close, after a rotation of about 165 degrees, as shown by the valve diagram.
Figure 5:
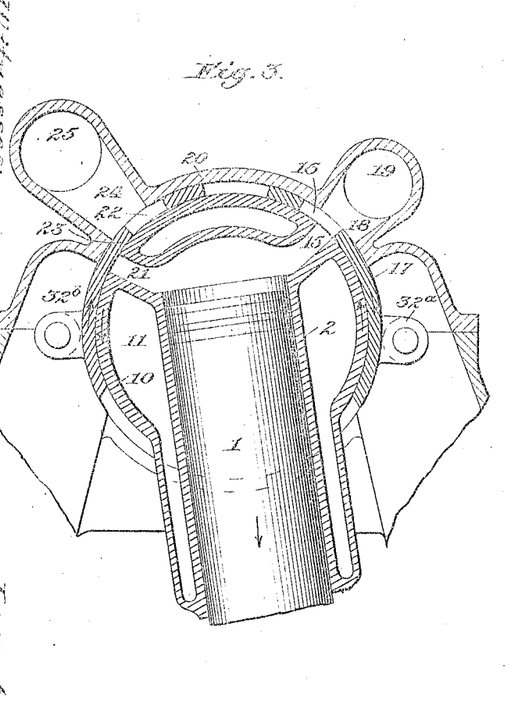
Fig. 5 is a similar view showing the intake valve just closed, after a rotation of 200° and the piston starting on its compression-stroke.
Figure 13:
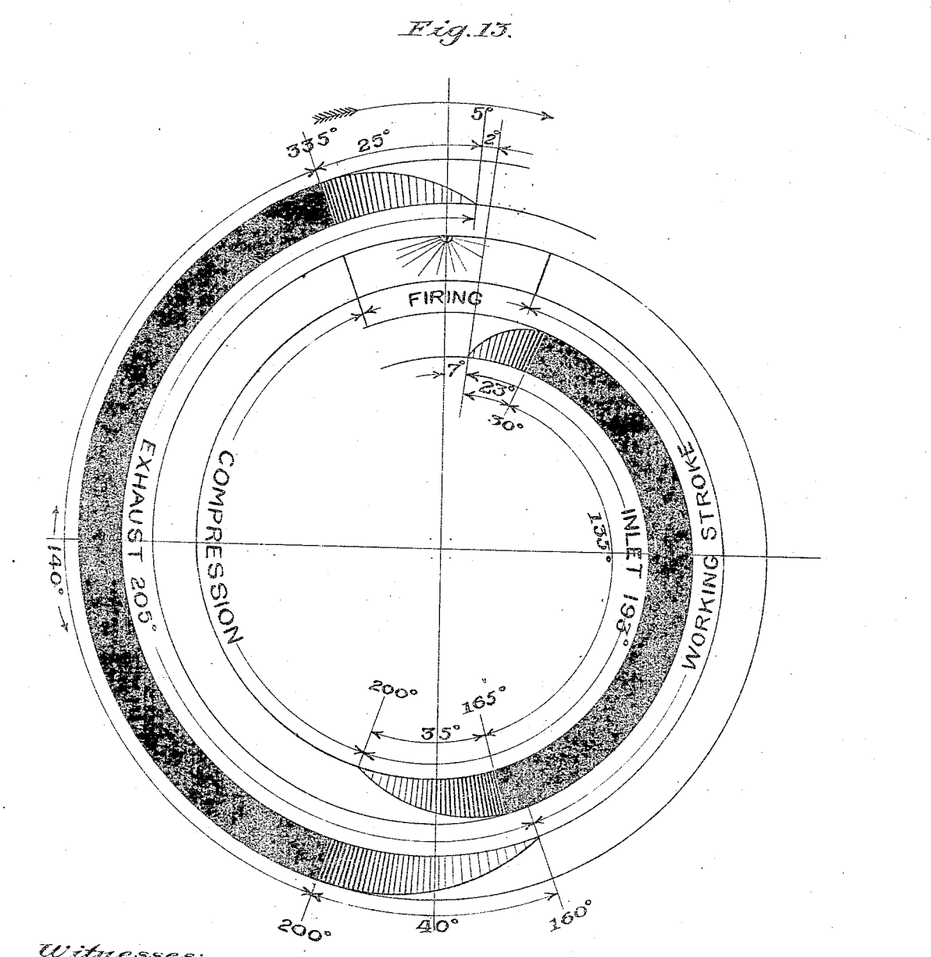
Fig. 13 is a diagram showing the extent of openings in the valves at different angles of rotation.
Figure 14:
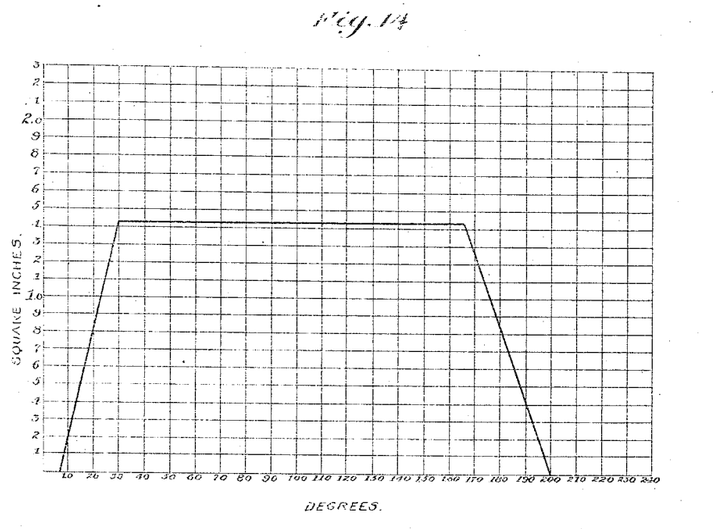
Fig. 14 is a graphic showing of operation of the intake valve.

The construction and operation of the engine are as follows: In Fig. 1, the engine is shown with the piston 1 at the top of a return stroke after discharging the gases, and the closing of the exhaust opening 21 at the left of the cylinder-head by exhaust valve 23, just before the opening of the intake port 15 at the right of the cylinder-head. This position also shows the cylinder 2 vertical with the piston 1 at the top. The lower end of the piston is journaled direct on the crank-pin 3 by the end-journal 4, cap-journal 5, and bolts 6. As the engine rotates, the crank 7 turns to the right about the shaft 8 as a center, and this turns the piston and cylinder about an axis in the center of the cylinder-head in a contraclockwise direction, as shown by the arrow. The valve 17 is simultaneously moved (by mechanism to be later described) in a clockwise direction, causing the opening 15 to communicate through opening 16 in the valve 17 with opening 18 in the upper casing 20, leading to the fuel supply-pipe 19. As the shaft 8 continues to rotate, the cylinder and valve 17 are turned farther and in opposite directions, thereby rapidly opening the passage between the opening 15 and 18, the full opening, as shown in Figs. 3 and 13, occurring after the shaft 8 has rotated through an angle of only about 30°. The continued rotation of the shaft past an angle of 90° causes the cylinder to reverse its direction of oscillation, and to oscillate in a clockwise direction, as shown by the arrow in Fig. 4, until an angle of about 165° is reached, the valve and its port 16, which is considerably longer than the cylinder-port 15, remaining practically stationary during this period. The direction of oscillation of the intake valve 17 then begins to reverse, causing this valve to close and the intake passage between the cylinder and casing to be quickly closed, since the cylinder-head and valve are again running in opposite directions, the closure taking place after the main shaft has rotated through an angle of about 200 degrees. While the intake passage is open, fuel is supplied to cylinder 2; and upon the closing of valve 17, and return stroke of the piston, Fig. 5, the gases in the cylinder are compressed. The cylinder continues to oscillate in a clockwise direction until an angle of about 270° is reached, after which its direction of oscillation is reversed to contra-clockwise, the direction of oscillation of exhaust valve 23 also changing. The direction of oscillation at the completion of the second stroke is shown by the arrows in Fig. 6; all valves remaining closed.

Figure 9:
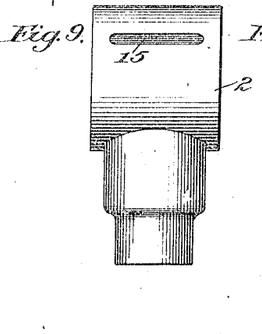
Fig. 9 is a reduced side view of the oscillating cylinder showing the intake port.
Figure 10:
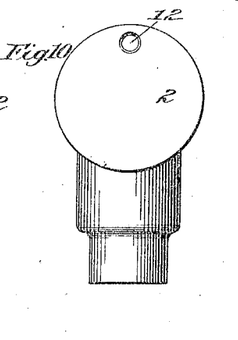
Fig. 10 is a reduced end view of the oscillating cylinder, showing the opening for water circulation.
Figures 11, 12:
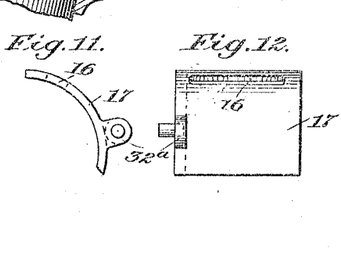
Fig. 11 is an end view of a valve, showing the lug to be connected to the connecting-rod.
Fig. 12 is a side view of the same, showing the opening and also the pin and lug.

The intake valve 17, exhaust valve 23, and the cylinder-head, all oscillate about the same axis, but not always in the same direction, nor with the same velocity. These valves 17 and 23 are, as will appear from Figs. 11 and 12, portions of cylinders having the same axis as and embracing the transverse cylinder-head 2 (see Figs. 9 and 10). The valves have on their outer peripheries lugs 32$^a$, 32$^b$, in which are pivoted links 31$^a$, 31$^b$, journaled at their lower ends on cranks 30$^a$, 30$^b$, respectively carried by shafts 33$^a$, 33$^b$. These shafts are rotated by gears 29$^a$, 29$^b$, which are driven, by idler 28, from gear 27 on the crank-shaft 8.

The location of the connecting rods on the secondary shafts is such as to cause the valves to oscillate one a few degrees behind the other, and at half the speed of the crank-shaft, due to the difference in speed of rotation between the gear wheels 27 and 29$^a$ and 29$^b$. The secondary shafts, connecting rods, and gears are inclosed in the enlargements 34$^a$, 34$^b$, of the middle casing 34.

Figure 2:
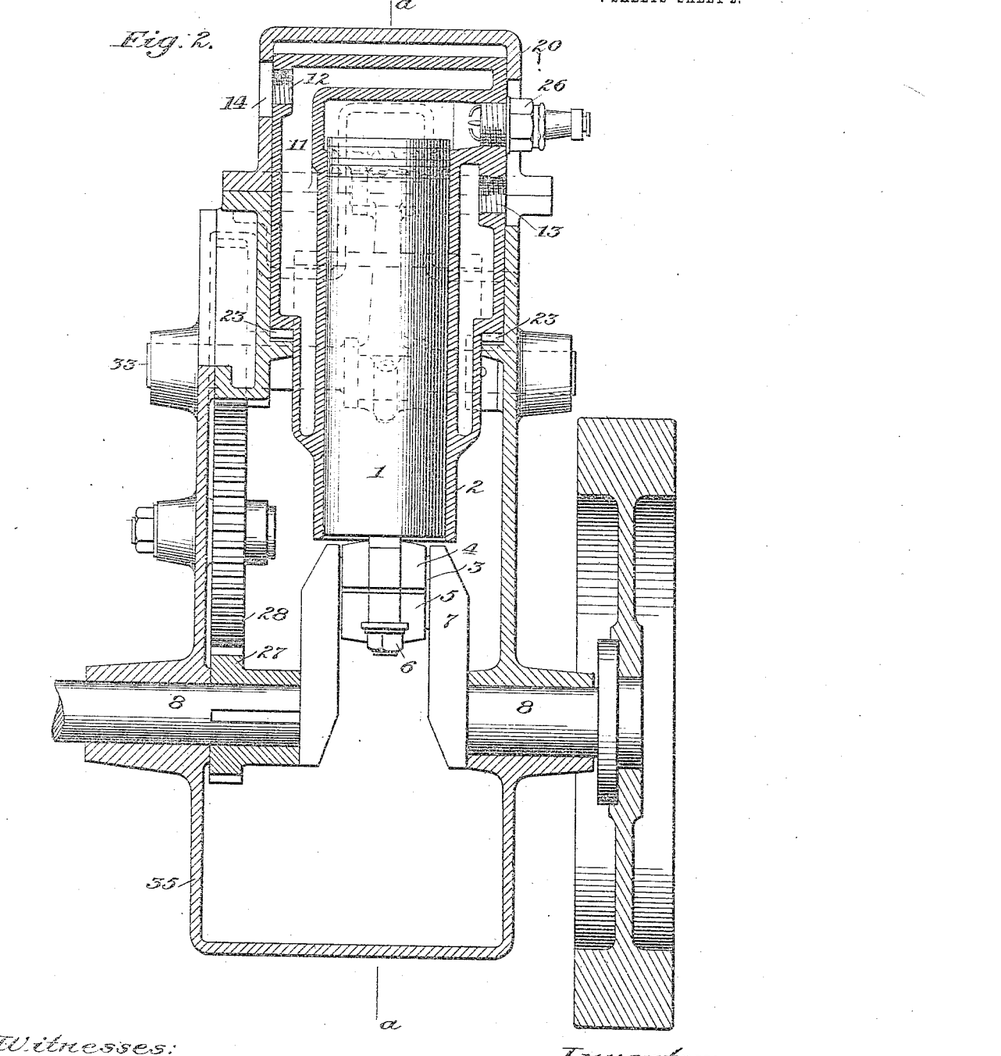
Fig. 2 is a vertical section along the line "b—b" of Fig. 1.
Figure 6:
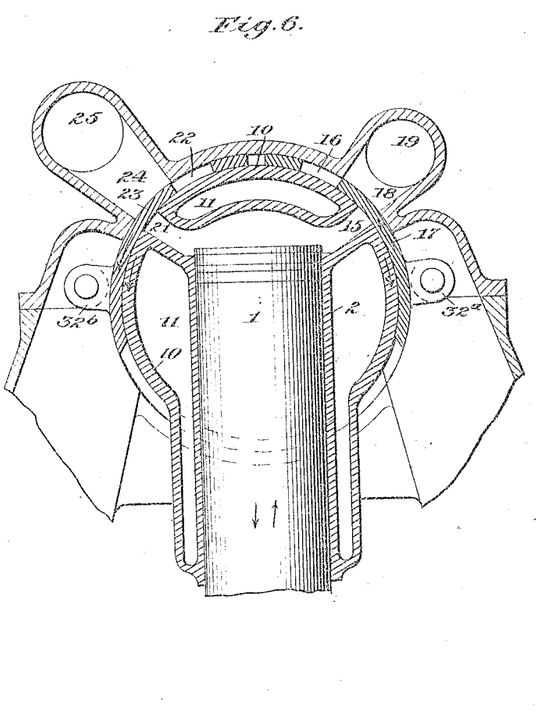
Fig. 6 is a similar view, showing the cylinder vertical, after a rotation of 360°, with both valves closed, and the engine in the "firing" position, ready to start on another revolution.

On the completion of the compression-stroke, Fig. 6, the fuel mixture is exploded by a spark from the spark-plug 26, Fig. 2, the explosion driving the piston forward, the cylinder oscillating as shown by the arrows, and the valves remaining closed.

Figure 7:
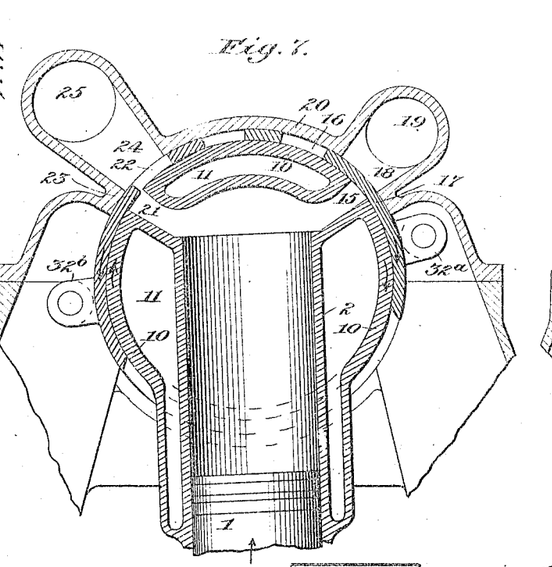
Fig. 7 is a similar view, showing the cylinder nearly vertical, the gases having expanded, the piston at the lower end of the cylinder, and the exhaust valve just opening, after a rotation of about 160°.
Figure 8:
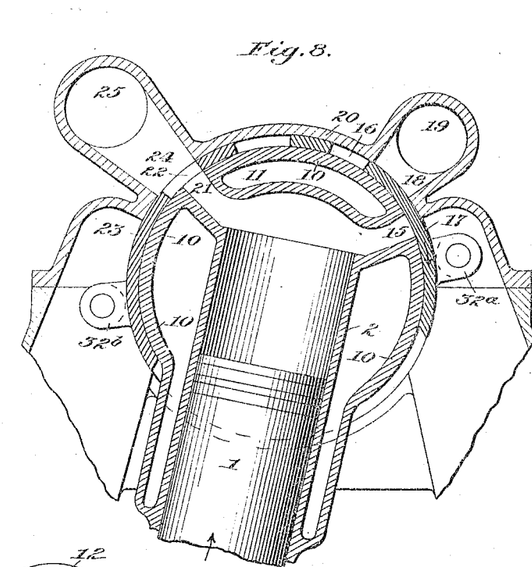
Fig. 8 is a similar view, showing the exhaust valve fully open and at the point where the direction of oscillation of the cylinder-head and exhaust valve changes, at an angle of rotation of about 270°.

On reaching the position shown in Fig. 7, after a rotation of 160° on the third stroke, the energy of the exploded gases will have been expended and the exhaust valve 23 will begin to open, the cylinder and valve now moving in opposite directions, and will be fully opened when an angle of 200° is reached. From this point, the gases will be completely exhausted by the return stroke of the piston; the direction of oscillation of the cylinder-head and exhaust valve changing at the position shown in Fig. 8; the direction of movement of the intake valve being shown by the arrow. The exhaust valve commences to close when an angle of rotation of 335° is reached, at which time the valves and cylinder are again oscillating in opposite directions, as shown in Fig. 1; the closing movement continuing until the exhaust passage is closed.

The valves 17 and 23 (Figs. 11 and 12) are "arc" shaped metal pieces, nearly surrounding the transverse cylindrical head 10 of the cylinder, and serve as a journal in which the cylinder may oscillate, as above described. The valves are supported upon and journaled within the upper casing 20, the latter having openings 18 and 24 connecting with intake and exhaust pipes 19 and 25, respectively. In the intake valve is an opening or port 16 connecting the intake opening 15 in the cylinder with intake opening 18 in the casing. Similarly, in the exhaust valve an opening or port 22 connects exhaust opening 21 in the cylinder with exhaust opening 24 in the casing.

It will be noted that the port openings in the cylinder are shorter than those in the valves, and those in the valves shorter than the openings in the casing; and that the directions of movement of the oscillating cylinder-head with reference to the oscillating valve are so timed that when either of the ports 15 or 21 have been fully opened that the corresponding valve is either practically stationary or moving in such direction that the cylinder port opening is kept unobstructed for a long period. In the particular instance shown, this period extends through 135° for the admission and 140° for the exhaust.

Instead of the valves resting on the surface of the bore of the casing, as shown, the casing may be recessed enough to incase the valves, so that the inner surfaces of the valves and casing are flush, both surfaces serving as the journal for the cylinder; or the valves may be made tubular, a part thereof completely encircling the extremities of the cylinder-head, and be placed side by side, having their respective openings in their relative positions; or the valves may be superimposed, one valve oscillating within the other, and the cylinder-head within the inner valve; the openings being properly located. All of the above modifications or motions are considered to be within the scope of this invention and claims.

The cylinder is provided with a water-jacket 11, as shown; the outer wall 10 thereof serving as the working surface of the transverse cylinder-head, in the journal. Circulation of water is provided for by suitable sliding openings, or by flexible tubes connected to the oscillating cylinder, at 12 and 13.

Fig. 13 shows diagrammatically the positions of, and extent of, openings in the valves during the several strokes. Assuming that the engine is running, then, in the position shown in Fig. 1, the exhaust valve is almost closed, and the piston is about to begin a down-stroke; a rotation of 5° of arc past the vertical closes the exhaust valve; all openings are entirely closed for the next two degrees; connection is then made with the intake valve at 7°, full opening being obtained after the shaft has rotated through 30°. The intake-passage remains fully open and admits fuel to the cylinder until an angle of about 165° is reached, after which the intake valve closes, and is entirely closed at an angle of 200°. The piston now enters upon its second stroke, the compression-stroke, during which the mixed air and fuel are compressed until the "firing" stage is reached, which occurs during an interval at the end of the second stroke and beginning of the third stroke. The gases are exploded during the "firing" stage, and the piston travels on its third stroke (second revolution) until an angle of 160° is reached when the exhaust valve begins to open, and is fully open at 200°, remaining open until an angle of 335° is reached, when it begins to close: during this return-stroke, the fourth stroke, the exploded gases are removed from the cylinder, the latter is cleaned to receive fresh fuel, and the exhaust valve closes, as shown in Fig. 1.

The angles of opening and closing of the valves, and the interval during which they may remain open and closed, may be varied in different types of engines to meet different conditions, without departing from the spirit of my invention.

Instead of using separate admission and exhaust valves, a single valve, to which is imparted the proper variations in direction and speed of oscillation, may be provided, and the use of a single oscillating valve in combination with an oscillating cylinder, is within the scope of my invention.

While I have chosen to illustrate my invention, as applied to a four-cycle engine, I desire it to be understood that it is equally applicable to engines of the two-cycle type, in which case a single valve only is used, the period of oscillation of the valve and cylinder then corresponding with each revolution of the crank-shaft.

Figure 15:
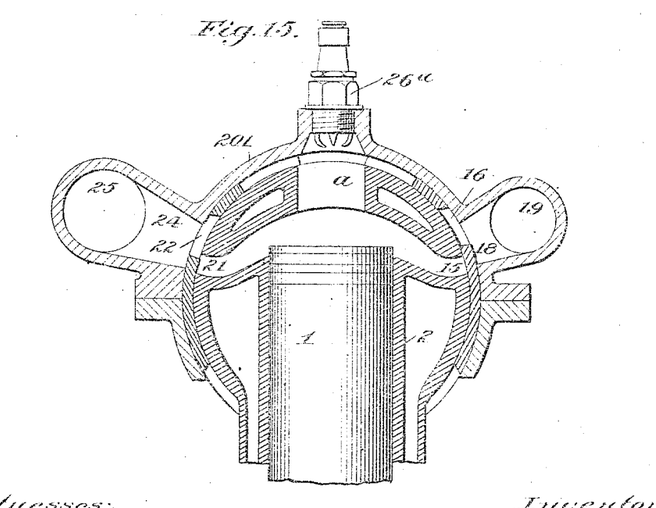
Fig. 15 is a section showing a modified form of cylinder-head.

In Fig. 15 is shown a modified form of cylinder-head. The cylinder, instead of being closed at the top, as in Fig. 2, is provided with an opening $a$, and the spark-plug 26ª is located at the top of the casing. By this arrangement the pressure of the explosion will be exerted against the casing, instead of against the inside of the cylinder-head. The pressure being taken off the cylinder, the valves will move more readily.

I claim:

1. In an internal-combustion engine, the combination of an oscillating cylinder having a portion thereof journaled within an oscillating valve, a piston, and a shaft having a crank to which said piston is connected, said cylinder oscillating about an axis parallel to the axis of the shaft.

2. In an internal-combustion engine, the combination of an oscillating cylinder having a portion thereof journaled within independently oscillating intake and exhaust valves.

3. In an internal-combustion engine, the combination of a casing having intake and exhaust openings, a cylinder, an oscillating valve between the casing and cylinder, adapted to open and close said openings, a piston, and a shaft having a crank to which said piston is connected, said cylinder oscillating about an axis parallel to the axis of the shaft.

4. In an internal-combustion engine, the combination of a casing serving as a journal, a valve adapted to oscillate about the common axis within said journal, and an oscillating cylinder having a transverse cylindrical head within the valve and oscillating upon the axis of said oscillating valve said valve being journaled between the casing and cylinder head.

5. In an internal-combustion engine, the combination of independently oscillating valves journaled within a casing, and oscillating cylinder and piston, said valves serving as a journal for said cylinder, means to oscillate the valves, and means to supply fuel to and exhaust gases from said cylinder.

6. In an internal-combustion engine, the combination of a casing, a valve within and concentric to said casing, a cylinder having a transverse cylindrical head within and concentric to said valve and casing, said valve and cylinder arranged to oscillate independently, and means to supply fuel to said cylinder.

7. In an internal-combustion engine, the combination of a casing adapted to serve as a journal, a valve concentric therewith and journaled therein, a cylinder having a transverse head concentric with said valve and casing and journaled in said valve, said valve and cylinder arranged to oscillate within said casing, and means to supply fuel to said cylinder.

8. In an internal-combustion engine, the combination of an oscillating valve, an oscillating cylinder having an end concentric to and journaled within said valve, a reciprocating piston in said cylinder, and a shaft having a crank, said piston being journaled directly to said crank.

9. In an internal-combustion engine, the combination of a valve, a cylinder having one end journaled within said valve and arranged to oscillate therein, a reciprocating piston, and a shaft having a crank, said piston being journaled directly to said crank.

10. In an internal-combustion engine, the combination of a casing, oscillating valves, and an oscillating cylinder, said valves concentric to and between said casing and cylinder, and common means for separately oscillating said cylinder and valves.

11. In an internal-combustion engine, the combination of a transversely oscillating cylinder having an intake opening, an oscillating valve having an opening therein, a casing having an opening for supplying fuel, the cylinder, valve and casing concentric to each other, means for causing the said openings to quickly open and register at one part of an oscillation and to quickly close at another part of an oscillation, a piston, and a shaft having a crank to which said piston is connected, said cylinder oscillating about an axis parallel to the axis of the shaft.

12. In an internal-combustion engine, the combination of a transversely oscillating cylinder having an exhaust opening, an oscillating valve having an opening therein, a casing having an opening for exhaust gases, the cylinder, valve and casing concentric to each other, means for causing the said openings to quickly open and register at one part of an oscillation and to quickly close at another part of an oscillation, a piston, and a shaft having a crank to which said piston is connected, said cylinder oscillating about an axis parallel to the axis of the shaft.

13. In an internal-combustion engine, the combination of a transversely oscillating cylinder having an intake opening, an oscillating valve having an opening therein, a casing inclosing said valve and cylinder and having an opening therein for supplying fuel, means for causing the openings in the cylinder, valve and casing to communicate and form a passage for the supply of fuel during a considerable portion of the oscillation, a piston, and a shaft having a crank to which said piston is connected, said cylinder oscillating about an axis parallel to the axis of the shaft.

14. In an internal-combustion engine, the combination of a transversely oscillating cylinder having an exhaust opening, an oscillating valve having an opening therein, a casing inclosing said valve and cylinder and having an opening therein for the exhaust of gases, means for causing the openings in the cylinder, valve and casing to communicate and form a passage for exhaust gases during a considerable portion of the oscillation, a piston, and a shaft having a crank to which said piston is connected, said cylinder oscillating about an axis parallel to the axis of the shaft.

15. In an internal-combustion engine, the combination of a casing having an intake opening, said casing adapted to serve as a journal, a valve concentric therewith and journaled therein and having an opening, a cylinder having a part concentric with said valve and casing and journaled in said valve and having an intake opening, said valve and cylinder arranged to oscillate about a transverse axis within said casing, means for causing the openings in said casing, valve and cylinder to communicate and form a passage to admit fuel to the cylinder, a piston, and a shaft having a crank to which said piston is connected, said cylinder oscillating about an axis parallel to the axis of the shaft.

16. In an internal-combustion engine, the combination of a casing having an exhaust opening, said casing serving as a journal, a valve concentric therewith and journaled therein and having an opening, a cylinder having a part concentric with said valve and casing and journaled in said valve and having an exhaust opening, said valve and cylinder arranged to oscillate about a transverse axis within said casing, means for causing the openings in said casing, valve and cylinder to communicate and form an exhaust passage for the gases within the cylinder, a piston, and a shaft having a crank to which said piston is connected, said cylinder oscillating about an axis parallel to the axis of the shaft.

17. In an internal-combustion engine, the combination of an oscillating cylinder having a transverse cylinder-head and having an intake opening, a reciprocating piston in said cylinder, a shaft having a crank connected to said piston, an oscillating valve whose axis of rotation coincides with the axis of said cylinder-head, and operated from said shaft, an opening in said valve, a casing concentric to said valve and having an opening for supplying fuel, and means for causing the openings in the cylinder, valve and casing to communicate quickly and to form a continuous passage for the fuel, to maintain the passage for a considerable portion of the oscillation, and to quickly interrupt said passage after the cylinder has been supplied with said fuel.

18. In an internal-combustion engine, the combination of an oscillating cylinder having a transverse cylinder-head and having an exhaust opening, a reciprocating piston in said cylinder, a shaft having a crank connected to said piston, an oscillating valve whose axis of rotation coincides with the axis of said cylinder-head, and operated from said shaft, an opening in said valve, a casing concentric to said valve and having an opening for exhaust gases, and means for causing the openings in the cylinder, valve and casing to communicate quickly and to form a continuous passage for the exhaust gases, to maintain the passage for a considerable portion of the oscillation, and to quickly interrupt said passage after the gases are removed.

19. In an internal-combustion engine, the combination of oscillating valves serving as a journal, an independently oscillating cylinder supported within said oscillating valves, a casing serving as a journal for said oscillating valves, said casing, valves and cylinder each having intake and exhaust openings, said intake openings adapted to form a passage during a part of one oscillation, and said exhaust-openings adapted to form a passage during a part of a different oscillation.

20. In an internal-combustion engine, the combination of a casing adapted to serve as a journal-box, valves concentric with said casing and journaled therein, a cylinder having a part concentric with said valves and casing, said valves and cylinder adapted to oscillate within said casing, said casing and cylinder each having inlet and exhaust openings, one valve having an inlet opening, another valve having an exhaust opening, and means for causing the intake openings to register and form a continuous passage for fuel gas when the exhaust opening is closed, and for causing the exhaust openings to register and form a continuous exhaust passage when the intake passage is closed.

21. In an internal-combustion engine, an oscillating valve, an oscillating cylinder concentric at one end with said valve, a reciprocating piston within said cylinder, a spark plug carried by said cylinder, a crank-shaft, said piston journaled directly on said crank-shaft, whereby the rotation of said shaft directly oscillates said cylinder, and means connected to said shaft for oscillating said valve.

22. In an internal-combustion engine, the combination of a piston, a crank-shaft, one end of said piston journaled on said crank-shaft, a cylinder for said piston and adapted to oscillate, valve serving as a journal for said cylinder, and adapted to independently oscillate, a casing serving as a journal for said valves, and means serving as intake and exhaust passages between said cylinder and the casing.

23. In an internal-combustion engine, the combination of a casing having an intake opening, an oscillating valve having an opening, an oscillating cylinder having an intake opening, said casing inclosing said cylinder and valve, a piston, said openings adapted to form a passage, and means for maintaining said openings in full communication for a period approximately equal to the working stroke of the piston.

24. In an internal-combustion engine, the combination of a casing having an exhaust opening, an oscillating valve having an opening, an oscillating cylinder having an exhaust opening, said casing inclosing said cylinder and valve, a piston, said openings adapted to form a passage and means for maintaining said openings in full communication for a period approximately equal to that of the return stroke of the piston.

25. In an internal-combustion engine, the combination with an oscillating cylinder having ports, of concentrically oscillating valves having ports longer than the cylinder ports, a casing having ports longer than the valve ports, and means for oscillating the cylinder and valves.

26. In an internal-combustion engine, the combination with a transversely oscillating cylinder having ports, of oscillating valves having ports, means for causing said cylinder and valves to oscillate in opposite directions during the closing and opening movements of said valves, a piston, and a shaft having a crank to which said piston is connected, said cylinder oscillating about an axis parallel to the axis of the shaft.

27. In an internal-combustion engine, the combination with an oscillating cylinder having inlet and exhaust ports, of concentrically oscillating valves having inlet and exhaust ports, a piston oscillating with said cylinder, a shaft connected to said piston and means connected to said shaft for causing said inlet ports and exhaust ports to successively register during one revolution of said shaft and for preventing their registering during the next revolution of said shaft.

In testimony whereof I affix my signature in presence of two witnesses.

HERMAN DOCK.

Witnesses:
CLARENCE E. ROCHE,
ROSCOE C. A. BABCOCK.

Correction in Letters Patent No. 1,135,365.

It is hereby certified that in Letters Patent No. 1,135,365, granted April 13, 1915, upon the application of Herman Dock, of Westerly, Rhode Island, for an improvement in "Internal-Combustion Engines," an error appears in the printed specification requiring correction as follows: Page 5, line 65, claim 22, for the word "valve" read *valves;* and that the said Letters Patent should be read with this correction therein that the same may conform to the record of the case in the Patent Office.

Signed and sealed this 21st day of September, A. D., 1915.

[SEAL.]

J. T. NEWTON,
*Acting Commissioner of Patents.*